(12) United States Patent
Davidson

(10) Patent No.: US 10,443,731 B2
(45) Date of Patent: Oct. 15, 2019

(54) GASKET COMPONENT WITH HALF-STOP AND METHOD OF MANUFACTURING

(71) Applicant: FEDERAL-MOGUL LLC, Southfield, MI (US)

(72) Inventor: Michael J. Davidson, Royal Oak, MI (US)

(73) Assignee: Tenneco Inc., Lake Forest, IL (US)

( * ) Notice: Subject to any disclaimer, the term of this patent is extended or adjusted under 35 U.S.C. 154(b) by 95 days.

(21) Appl. No.: 15/864,467

(22) Filed: Jan. 8, 2018

(65) Prior Publication Data

US 2018/0128374 A1    May 10, 2018

Related U.S. Application Data

(62) Division of application No. 14/598,547, filed on Jan. 16, 2015, now Pat. No. 9,863,535.

(60) Provisional application No. 61/928,664, filed on Jan. 17, 2014.

(51) Int. Cl.
*F16J 15/08* (2006.01)
*F02F 11/00* (2006.01)

(52) U.S. Cl.
CPC ......... *F16J 15/0825* (2013.01); *F02F 11/002* (2013.01); *F16J 15/0818* (2013.01); *F16J 2015/0837* (2013.01); *F16J 2015/0862* (2013.01); *Y10T 29/49297* (2015.01)

(58) Field of Classification Search
CPC ............... F16J 15/0818; F16J 15/0825; F16J 2015/085; F16J 2015/0856; F16J 2015/0862; F02F 11/00; F02F 11/002; Y10T 29/49297

USPC ....................................................... 29/888.3
See application file for complete search history.

(56) References Cited

U.S. PATENT DOCUMENTS

| | | | | | |
|---|---|---|---|---|---|
| 5,568,932 | A | * | 10/1996 | Tanaka | F16J 15/0825 277/595 |
| 5,584,490 | A | * | 12/1996 | Inoue | F16J 15/0825 277/595 |
| 5,601,292 | A | * | 2/1997 | Tanaka | F16J 15/0825 277/593 |
| 5,690,342 | A | * | 11/1997 | Tanaka | F16J 15/0825 277/594 |
| 5,791,659 | A | * | 8/1998 | Takada | F16J 15/0825 277/593 |
| 6,076,833 | A | * | 6/2000 | Geshi | F16J 15/0825 277/593 |

(Continued)

*Primary Examiner* — Nicholas L Foster
(74) *Attorney, Agent, or Firm* — Robert L. Stearns; Dickinson Wright, PLLC

(57) ABSTRACT

A gasket for providing a gas and fluid tight between parts of an internal combustion engine, for example around a combustion chamber opening, is provided. The gasket includes a functional layer with a full embossment spaced from the combustion chamber opening. A stopper layer is attached to the functional layer adjacent the combustion chamber opening. After attaching the stopper layer to the functional layer, half embossments are simultaneously formed in the functional layer and the stopper layer adjacent the combustion chamber opening. The aligned half embossments are together referred to as a half-stop. The half-stop maintains the load on the stopper layer, limits compression on the full embossment, and protects the full embossment from combustion gases when the gasket is compressed between two parts of the internal combustion engine.

5 Claims, 3 Drawing Sheets

(56) References Cited

U.S. PATENT DOCUMENTS

| | | | | |
|---|---|---|---|---|
| 6,089,572 A * | 7/2000 | Plunkett | F16J 15/0825 | 277/592 |
| 6,186,513 B1 * | 2/2001 | Udagawa | F16J 15/0818 | 277/592 |
| 6,328,313 B1 * | 12/2001 | Teranishi | F02F 11/002 | 277/592 |
| 6,328,314 B1 * | 12/2001 | Jinno | F16J 15/0825 | 277/593 |
| 6,349,945 B1 * | 2/2002 | Schmucker | F16J 15/0818 | 277/592 |
| 6,550,782 B2 * | 4/2003 | Okazaki | F02F 11/002 | 277/590 |
| 6,554,286 B1 * | 4/2003 | Tanaka | F16J 15/0818 | 277/591 |
| 6,769,696 B2 * | 8/2004 | Diez | F16J 15/0825 | 277/593 |
| 7,234,705 B2 * | 6/2007 | Novil | F16J 15/0825 | 277/592 |
| 7,989,027 B2 * | 8/2011 | Abe | F16J 15/0818 | 427/301 |
| 8,267,407 B2 * | 9/2012 | Schmucker | F16J 15/0825 | 277/593 |
| 9,127,621 B2 * | 9/2015 | Hu | F16J 15/0818 | |
| 2002/0000696 A1 * | 1/2002 | Okazaki | F02F 11/002 | 277/592 |
| 2003/0127804 A1 * | 7/2003 | Uchida | F16J 15/0818 | 277/592 |
| 2005/0187325 A1 * | 8/2005 | Yuan | C08K 3/08 | 524/394 |
| 2005/0189724 A1 * | 9/2005 | Schmitz | F16J 15/0825 | 277/592 |
| 2008/0042371 A1 * | 2/2008 | Flemming | F16J 15/0818 | 277/593 |
| 2008/0211197 A1 * | 9/2008 | Abe | F16J 15/0818 | 277/653 |
| 2013/0320630 A1 * | 12/2013 | Okano | F16J 15/0825 | 277/592 |

\* cited by examiner

GASKET COMPONENT WITH HALF-STOP AND METHOD OF MANUFACTURING

CROSS REFERENCE TO RELATED APPLICATION

This U.S. Divisional Application claims the benefit of U.S. Utility patent application Ser. No. 14/598,547, filed Jan. 16, 2015, which claims priority to U.S. Provisional Application Ser. No. 61/928,664, filed Jan. 17, 2014, which is incorporated herein by reference in their entirety.

BACKGROUND OF THE INVENTION

1. Field of the Invention

This invention relates generally to gaskets for providing a seal between parts of an internal combustion engine, and methods of manufacturing the same.

2. Related Art

Gaskets are typically used to establish a gas and fluid tight seal between two parts clamped together, such as a cylinder head and an engine block of an internal combustion engine. Such gaskets oftentimes include a functional layer having an embossment, also referred to as a sealing bead, to facilitate the tight seal. The functional layer with the embossment is compressed, optionally with one or more additional functional layers or distance layers, in effort to establish the gas and fluid tight seal. However, when clamping the gasket between the cylinder head and the engine block, damage can occur to the embossment by over-compression. If the embossment is substantially flattened, the embossment loses its ability to exert a high compression sealing pressure, and fatigue cracks can form in the area of the embossment. Thus, a planar stopper is typically incorporated into the cylinder head gasket to restrict compression of the embossment between the cylinder head and the engine block. The stopper is typically a separate component spaced from the embossment.

Federal-Mogul has introduced high performance cylinder head gaskets including stoppers and high-strength, dynamic embossment technology. An exemplary gasket provided by Federal-Mogul includes a pair of functional layers each including a full embossment. Each full embossment presents a convex surface facing toward the other full embossment. A planar stopper is welded to one of the functional layers adjacent the full embossment. A half embossment, referred to as a Flexstop®, is formed in the other functional layer and is axially aligned with the stopper. The half embossment extends inwardly toward the stopper in the same direction as the full embossment. The half embossment maintains a load on the stopper while under loading and joint dynamics, such as headlift.

SUMMARY OF THE INVENTION

One aspect of the invention provides a gasket including a functional layer and a stopper layer for sealing parts of an internal combustion engine. The functional layer extends radially from a first edge surrounding a first opening to a second edge. The functional layer includes a full embossment disposed between the first edge and the second edge, and a half embossment disposed between the first edge and the full embossment. The stopper layer is attached to the functional layer between the first edge and the full embossment. The stopper layer also includes a half embossment aligned with the half embossment of the functional layer.

The invention also provides a method of manufacturing a gasket for sealing parts of an internal combustion engine. The method includes providing a functional layer extending radially from a first edge surrounding a first opening to a second edge; and forming a full embossment in the functional layer between the first edge and the second edge. The method also includes attaching a stopper layer to the functional layer adjacent the first edge. After attaching the stopper layer to the functional layer, the method includes forming a half embossment in the functional layer while simultaneously forming a half embossment in the stopper layer aligned with the half embossment of the functional layer.

The gasket provided by the invention can incorporate the high-strength, dynamic embossment technology in essentially a single layer, i.e. the stopper layer joined to the functional layer, and by a single process step. The half embossments maintain the load on the stopper layer, limit compression on the full embossment, and protect the full embossment from combustion gases when the gasket is compressed between the parts of the internal combustion engine.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
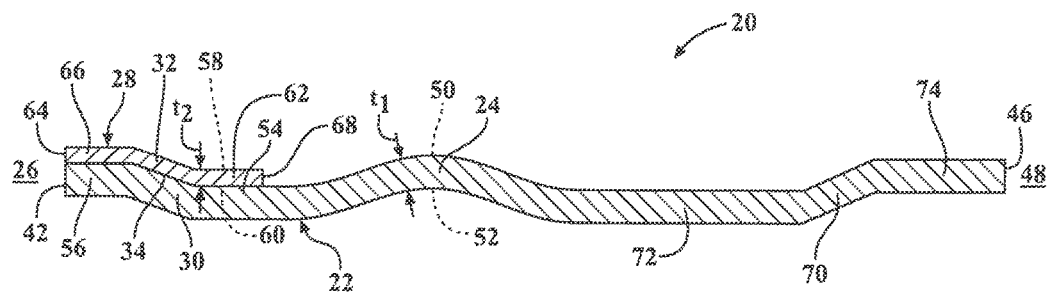
FIG. 1 is a radial cross-sectional side view of a gasket component according to one exemplary embodiment of the invention.
Figure 2:
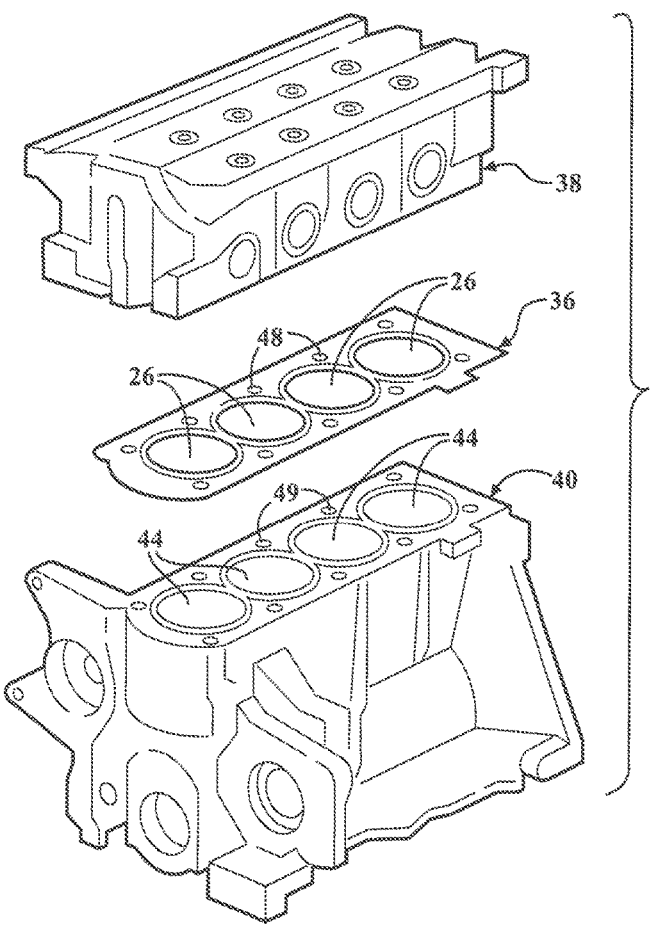
FIG. 2 is a perspective, exploded view of a cylinder head gasket including the gasket component disposed between an engine block and cylinder head of an internal combustion engine according to an exemplary embodiment.
Figure 3:
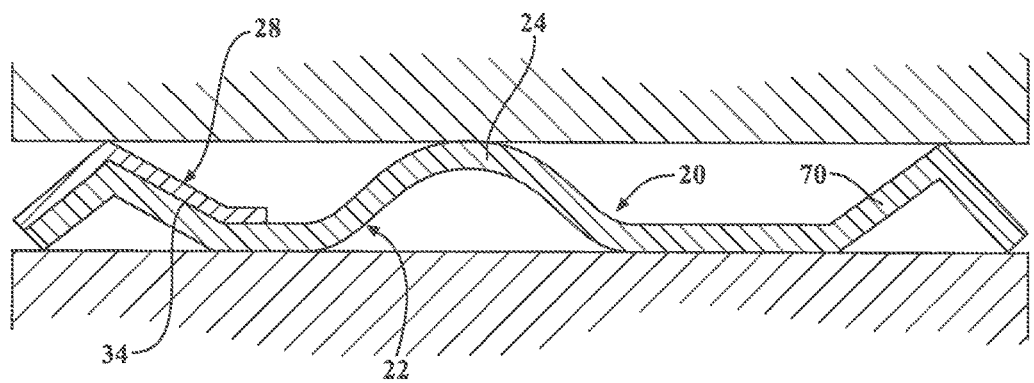
FIG. 3 is a radial cross-sectional side view of the gasket component of FIG. 1 compressed between an engine block and cylinder head.
Figure 4:
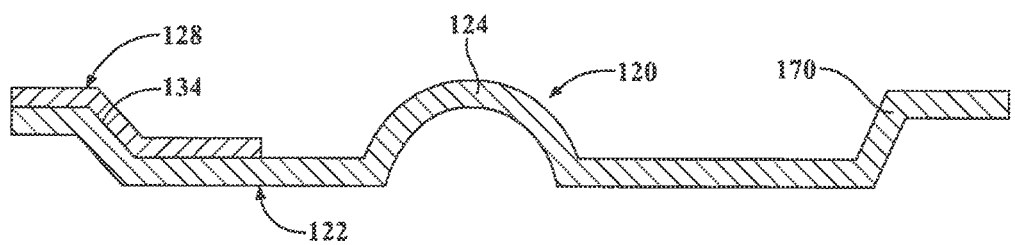
FIGS. 4-7 are radial cross-sectional side views of the gasket component according to other exemplary embodiments of the invention.
Figure 5:
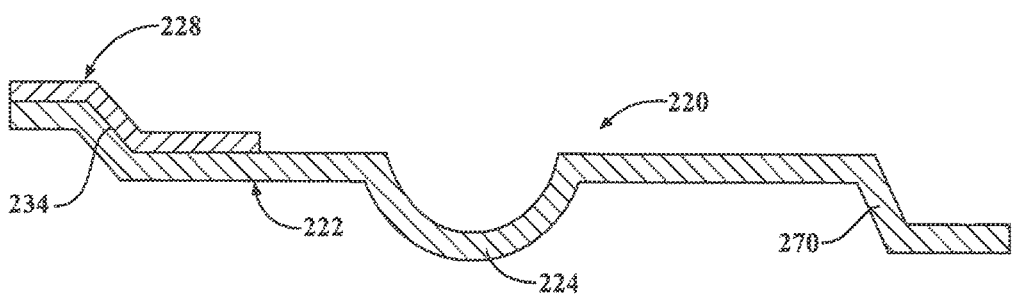
Figure 6:
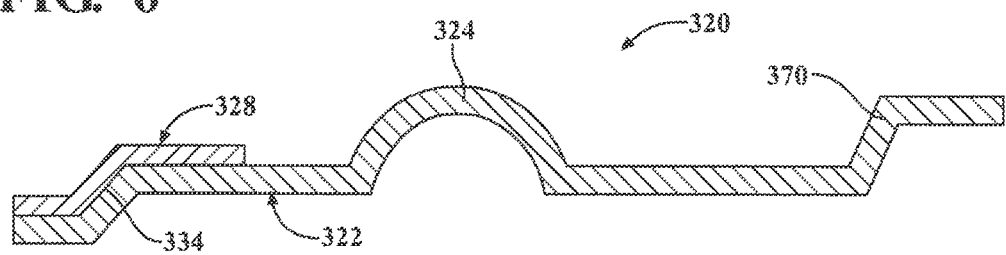
Figure 7:
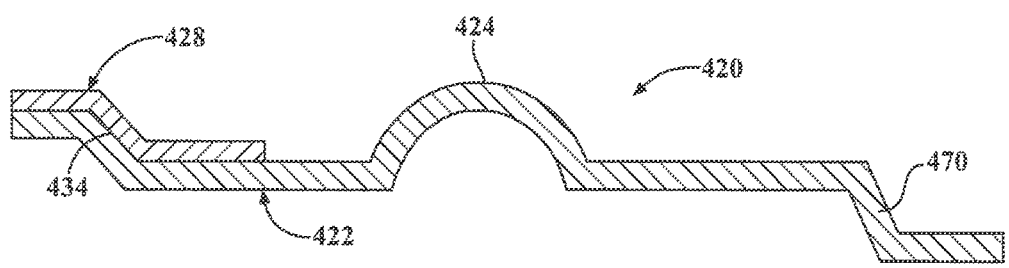
Figure 8:
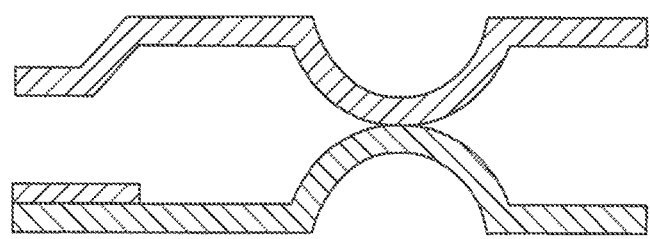
FIG. 8 is a radial cross-sectional side view of a comparative gasket component.

Referring to the FIG. 1, a gasket component 20 for providing a gas and fluid seal between two parts is generally shown. The gasket component 20 comprises a functional layer 22 including a full embossment 24 spaced from a first opening 26, such as a combustion chamber opening, and a stopper layer 28 disposed between the first opening 26 and the full embossment 24. The stopper layer 28 and the functional layer 22 each include a half embossment 30, 32, which together are referred to as a half-stop 34, located between the first opening 26 and the full embossment 24. The half-stop 34 is formed in a single process step and limits compression on the full embossment 24 when the gasket component 20 is compressed between the two parts. Thus, the gasket component 20 can incorporate high-strength, dynamic embossment technology in essentially a single layer and by a single process step. An exemplary cylinder head gasket 36 including the gasket component 20 is shown in FIG. 2. An enlarged view of the gasket component 20 compressed between the two parts is shown in FIG. 3. Other exemplary gasket components 20 having designs that differ from the design of FIG. 1 are shown in FIGS. 4-7. FIG. 8 illustrates a comparative gasket component including the previously developed Flexstop® feature.

The gasket component 20 of FIG. 1 is typically used in combination with other layers to provide a multilayer static gasket, such as the cylinder head gasket 36 shown in FIG. 2. The cylinder head gasket 36 provides a tight gas and fluid seal between the first part, such as a cylinder head 38, and the second part, such as an engine block 40 of an internal combustion engine. However, the gasket component 20 could alternatively be used in other gasket applications, such as those typically utilizing embossments and stoppers. The gasket component 20 can also be used independently without any other layers.

The functional layer 22 of the gasket component 20 is typically formed of steel, such as fully hardened spring steel, or another flexible metal. The functional layer 22 of the gasket component 20 could alternatively be formed of rubber, or another non-metal material. The functional layer 22 includes a first edge 42 presenting the first opening 26 for aligning with a bore opening 44 of the engine block 40. When the gasket component 20 is used in the cylinder head gasket 36, the gasket component 20 typically presents four of the first openings 26, as shown in FIG. 2. The functional layer 22 also typically includes a second edge 46 presenting a second opening 48 for aligning with a secondary opening 49 of the engine block 40 and cylinder head 38. The secondary opening 49 of the engine block 40 can function as a bolt hole or as an oil or coolant passage. When the gasket component 20 is used in the cylinder head gasket 36, the gasket component 20 includes a plurality of the second openings 48.

The functional layer 22 of the gasket component 20 includes an upper surface 50 and an oppositely facing lower surface 52 presenting a thickness $t_1$ therebetween, as shown in FIG. 1. When the gasket component 20 is used to form the cylinder head gasket 36, the upper surface 50 faces toward the cylinder head 38, and the lower surface 52 faces toward the engine block 40. Alternatively, the gasket component 20 could be flipped such that the upper surface 50 faces toward the engine block 40, and the lower surface 52 faces toward the cylinder head 38. The thickness $t_1$ of the functional layer 22 is preferably consistent from the first opening 26 to the second opening 48 and throughout the functional layer 22. However, the thickness $t_1$ of the functional layer 22 could vary slightly between the first opening 26 and the second opening 48 due to steel thickness tolerances. In one embodiment, the thickness $t_1$ of the functional layer 22 is from about 0.1 mm to about 0.3 mm.

As shown in FIG. 1, the functional layer 22 includes the full embossment 24, also referred to as a full bead, located between the first opening 26 and the second opening 48. The full embossment 24 extends circumferentially and continuously around the first opening 26 and facilitates the seal about the first opening 26 when the gasket component 20 is compressed between the two parts. When the gasket component 20 is used in the cylinder head gasket 36, the full embossment 24 provides a gas and fluid-tight seal about the bore opening 44 of the engine block 40.

The upper surface 50 along the full embossment 24 presents a convex shape and the lower surface 52 presents a concave shape. As shown in FIG. 1, the full embossment 24 extends outwardly relative to adjacent sections of the upper surface 50 of the functional layer 22. The upper surface 50 and the lower surface 52 of the functional layer 22 are typically planar around the entire circumference of the full embossment 24. In other words, the functional layer 22 is typically flat in the areas surrounding the full embossment 24. The planar portion of the upper surface 50 and the planar portion of the lower surface 52 disposed between the full embossment 24 and the half embossment 30 are together referred to as a first planar area 54. The planar portion of the upper surface 50 and the planar portion of the lower surface 52 disposed between the half embossment 30 and the first edge 42 are together referred to as a second planar area 56. When the gasket component 20 is used in the cylinder head gasket 36, the first planar area 54 and the second planar area 56 of the functional layer 22 are parallel to an upper surface of the engine block 40 and a lower surface of the cylinder head 38. It is noted that although the terms "upper" and "lower" are used when describing the surfaces of the functional layer 22, the upper surface 50 could be disposed below the lower surface 52.

The half embossment 30 of the functional layer 22 is disposed radially between the first edge 42 and the full embossment 24, and it is axially aligned with the half embossment 32 of the stopper layer 28. In the exemplary embodiments shown in the Figures, the functional layer 22 is bent in two locations to form the half embossment 30. Thus, the half embossment 30 extends at an angle relative to the first planar area 54 and the second planar area 56. In this case, the upper surface 50 and the lower surface 52 along the first planar area 54 are parallel to one another. The upper surface 50 and the lower surface 52 along the half embossment 30 are also parallel to one another but disposed at an angle relative to the adjacent first and second planar areas 54, 56. In the exemplary embodiments, the first half embossment 30 extends at an angle of 5 to 30 degrees relative to the first planar area 54 and the second planar area 56.

The gasket component 20 includes the stopper layer 28 directly attached to the functional layer 22 around the first opening 26 without another layer therebetween, as shown in FIG. 1. The stopper layer 28 includes an upper surface 58 and an oppositely facing lower surface 60 which is attached to the upper surface 50 of the functional layer 22. It is noted that although the terms "upper" and "lower" are used when describing the surfaces 58, 60 of the stopper layer 28, the upper surface 58 could be disposed below the lower surface 60.

The upper surface 58 and the lower surface 60 of the stopper layer 28 are typically planar around the entire circumference of the half embossment 32. In other words, the stopper layer 28 is typically flat in the areas surrounding the half embossment 32. The planar portion of the upper surface 58 and the planar portion of the lower surface 60 disposed between the full embossment 24 and the half embossment 32 are together referred to as a first planar area 62. The first planar area 62 of the stopper layer 28 is aligned with the first planar area 54 of the functional layer 22. The planar portion of the upper surface 58 and the planar portion of the lower surface 60 of the stopper layer 28 disposed between the half embossment 32 of the stopper layer 28 and the first opening 26 is referred to as a second planar area 66. The second planar area 66 of the stopper layer 28 is aligned with the second planar area 56 of the functional layer 22. When the gasket component 20 is used in the cylinder head gasket 36, the planar upper surface 58 and lower surface 60 of the stopper layer 28 are parallel to an upper surface of the engine block 40 and a lower surface of the cylinder head 38.

The lower surface 60 of the stopper layer 28 is preferably laser welded to the upper surface 50 of the functional layer 22, but can be attached using other methods. After laser welding, a gap could exist between the stopper layer 28 and the functional layer 22, for example due to springback, but this gap would be closed when the stopper layer 28 and the functional layer 22 are under compression. The stopper layer 28 is typically formed of metal, such as steel or another metal. The stopper layer 28 of the gasket component 20 could alternatively be formed of rubber, or another non-metal material.

The stopper layer 28 also includes a first edge 64 presenting the first opening 26. As shown in FIG. 1, the first edge 64 of the stopper layer 28 at the first opening 26 is aligned with the first edge 42 of the functional layer 22 at the first opening 26. The stopper layer 28 extends from the first edge 64 at the first opening 26 to a second edge 68 located along the first planar area 54 of the functional layer 22 between the half stop 34 and the full embossment 24. The total surface area presented by the stopper layer 28 is less than the total surface area of the functional layer 22.

The upper surface 58 and the lower surface 60 of the stopper layer 28 also present a thickness $t_2$ therebetween. The thickness $t_2$ of the stopper layer 28 is less than the thickness $t_2$ of the functional layer 22. In the embodiment of FIG. 1, the thickness $t_2$ of the stopper layer 28 is equal to less than one half of the thickness $t_1$ of the functional layer 22. However, the thickness $t_2$ of the stopper layer 28 and the thickness $t_1$ of the functional layer 22 can vary depending on the application.

The half embossment 32 of the stopper layer 28 is disposed radially between the first edge 64 and the full embossment 24, and it is axially aligned with the half embossment 30 of the functional layer 22. In the exemplary embodiments shown in the Figures, the stopper layer 28 is bent in two locations to form the half embossment 32. Thus, the half embossment 32 of the stopper layer 28 extends at an angle relative to the first planar area 62 and the second planar area 66. In this case, the upper surface 58 and the lower surface 60 along the first planar area 62 are parallel. The upper surface 58 and the lower surface 60 along the half embossment 32 are also parallel to one another but disposed at an angle relative to the adjacent second planar area 66. In the exemplary embodiments, angle of the half embossment 32 of the stopper layer 28 is equal to the angle of the half embossment 30 of the functional layer 22. Thus, the angle of the half embossment 32 is about 5 to 30 degrees relative to the first planar area 62 and the second area 66.

As stated above, the functional layer 22 and the stopper layer 28 are formed simultaneously in a single process step to present the axially aligned half embossments 30, 32, which together provide the half-stop 34, adjacent the first opening 26. This process step can include a single shaping, blanking, or bending step, after the stopper layer 28 has been joined to the functional layer 22.

As shown in the Figures, the half embossment 30 of the functional layer 22 is disposed directly below the half embossment 32 of the stopper layer 28. Typically, the stopper layer 28 and the functional layer 22 are bent together in two locations to form the half embossments 30, 32 which together form the half-stop 34. The half-stop 34 is not parallel to the adjacent planar areas 54, 56, 62, 66. At the first location, the stopper layer 28 and the functional layer 22 are bent at the same angle, which is about 5 to 30 degrees, relative to the first planar areas 54, 62. At the second location, the stopper layer 28 and the functional layer 22 are also bent at the same angle, which is about 5 to 30 degrees, relative to the second planar areas 56, 66. In the exemplary embodiments, the second location is closer to the first opening 26 than the first location. The half embossments 30, 32 also extend continuously around the first opening 26, like the full embossment 24.

In the embodiment of FIG. 1, the half embossments 30, 32 and full embossment 24 extend outwardly and upwardly in the same direction relative to the first planar areas 54, 62. However, the half embossments 30, 32 and full embossment 24 can also extend outwardly and downwardly in the same direction relative to the first planar areas 54, 62. In another embodiment, the half embossments 30, 32 and full embossment 24 each extend outwardly in opposite directions relative to the first planar areas 54, 62.

As shown in FIG. 3, when the gasket component 20 is used in a cylinder head gasket 36, the half-stop 34 extends at an angle relative to the upper surface of the engine block 40 and the lower surface of the cylinder head 38 until compressed, in which case the half-stop 34 could possibly become flat. In addition, when the gasket component 20 is used in the cylinder head gasket 36, the first planar areas 54, 62 extend parallel to the upper surface of the engine block 40 and the lower surface of the cylinder head 38. The second planar areas 56, 66 can also extend at an angle relative to the upper surface of the engine block 40 and the lower surface of the cylinder head 38, as shown in FIG. 3, but could also become flat when compressed so that the gasket component 20 is flat around the first opening 26.

During use of the gasket component 20 in a cylinder head gasket 36, the half-stop 34 maintains the load from the cylinder head 38 on the stopper layer 28, which limits the compression of the full embossment 24. The half-stop 34 also protects the full embossment 24, and any protective coating (not shown) applied to the full embossment 24, from combustion firing. In certain embodiments, the protective coating is a polymer coating and is disposed on at least one of the surfaces of the stopper layer 28 and on at least one of the surfaces of the functional layer 22 to enhance the performance and durability of the gasket component 20. The coating has a thickness which is less than the thickness $t_2$ of the stopper layer 28.

In one embodiment, as shown in FIG. 1, the gasket component 20 includes an additional half embossment 70, formed only in the functional layer 22. This additional half embossment 70 is disposed between the full embossment 24 and the second edge 46 presenting the second opening 48. In the embodiment of FIG. 1, the additional half embossment 70 mirrors the half embossment 30 formed in the functional layer 22 and the half embossment 32 formed in the stopper layer 28. A third planar area 72 is located between the full embossment 24 and the additional half embossment 70, and a fourth planar area 74 is located between the additional half embossment 70 and the second opening 48. The additional half embossment 70 extends at an angle relative to the third planar area 72 and the fourth planar area 74. In the embodiment of FIG. 1, the additional half embossment 70 extends outwardly in the same direction as the half-stop 34, but could alternatively extend in the opposite direction as the half-stop 34.

Prior to compressing the gasket component 20 between the cylinder head 38 and the engine block 40, the fourth planar area 74 of the functional layer 22 adjacent the second opening 48 is aligned with and is parallel to the first planar area 62 of the functional layer 22 adjacent the first opening 26, as shown in FIG. 1. However, after compressing the gasket component 20 between the cylinder head 38 and the engine block 40, the gasket component 20 loses its parallelism, as shown in FIG. 3.

The gasket component 20 comprising the half-stop 34 and the additional half embossment 70, can have various designs, alternative to the design shown in FIG. 1, depending on the application. Alternative exemplary designs are shown in FIGS. 4-7. The gasket component 120 of FIG. 4 includes a design similar to the gasket component 20 of FIG. 1. In the gasket component 220 of FIG. 5, the full embossment 224 and the additional half embossment 270 extend in a direction opposite the half-stop 234. In this embodiment, the full embossment 224 and the half embossment 270 extend toward the engine block 40 instead of toward the cylinder head 38. In the gasket component 320 of FIG. 6, the full embossment 324 and the additional half embossment 370 also extend in a direction opposite the half-stop 334. In this embodiment, the half-stop 334 extends toward the engine block 40 instead of toward the cylinder head 38. In the gasket component 420 of FIG. 7, the additional half embossment 470 extends in a direction opposite the full embossment 424 and the half-stop 434. In this embodiment, the half-stop 434 and the full embossment 424 extend toward the cylinder head 38 while the additional half embossment 470 extends toward the engine block 40. For comparison purposes, a gasket component 520 including a Flexstop® is shown in FIG. 8.

Another aspect of the invention provides a method of manufacturing the gasket component 20 including the full embossment 24 and the half-stop 34. The method includes providing the functional layer 22, which is typically blanked. Next, the stopper layer 28 is attached to the functional layer 22, preferably by laser welding. However, other methods can be used to join the two layers 22, 28 together to effectively form a single layer. The functional layer 22 and stopper layer 28 also go through a secondary blanking step.

The method further includes forming the full embossment 24 in the functional layer 22 and forming the half-stop 34 in the functional layer 22 and the stopper layer 28. The step of forming the half-stop 34 is conducted in a single step, such as by bending or shaping the functional layer 22 and stopper layer 28 together in two locations, as discussed above. The full embossment 24 can be formed before or after the half-stop 34. The method can also include forming the additional half embossment 70 in the functional layer 22, either before or after forming the full embossment 24, and either before or after forming the half-stop 34.

The method can also include applying the protective coating to the exposed surfaces of the functional layer 22 and stopper layer 28, for example by spraying. The step of applying the coating can be conducted before or after the secondary blanking and forming steps.

As discussed above, the gasket component 20 can be used alone as a single layer gasket, or a single layer of the static multi-layer cylinder head gasket 36. Alternatively, the gasket component 20 can be used in another type of gasket application, such any that would typically include embossments and stoppers.

Obviously, many modifications and variations are possible in light of the above teachings and may be practiced otherwise than as specifically described while within the scope of the claims.

What is claimed is:

1. A method of manufacturing a gasket for providing a seal between parts of an internal combustion engine, comprising the steps of:
providing a functional layer extending radially from a first edge surrounding a first opening to a second edge;
forming a full embossment in the functional layer between the first edge and the second edge;
attaching a stopper layer to the functional layer adjacent the first edge; and
forming a half embossment in the functional layer while simultaneously forming a half embossment in the stopper layer aligned with the half embossment of the functional layer after attaching the stopper layer to the functional layer.

2. The method of claim 1, wherein the step of forming the half embossments includes bending the functional layer and the stopper layer at two locations so that the half embossments are disposed at an angle relative to a first planar area located between the half embossments and the full embossment and at an angle relative to a second planar area located between the first edge and the half embossments.

3. The method of claim 2, wherein the angle of the embossments is 5 to 30 degrees.

4. The method of claim 1, wherein the step of attaching the stopper layer to the functional layer includes laser welding the stopper layer to the functional layer.

5. The method of claim 1 including forming an additional half embossment in the functional layer between the full embossment and the second edge.

* * * * *